(12) United States Patent
Mathur

(10) Patent No.: US 10,147,340 B2
(45) Date of Patent: Dec. 4, 2018

(54) SIMULATION MODULE

(71) Applicant: BOSTON SCIENTIFIC SCIMED, INC., Maple Grove, MN (US)

(72) Inventor: Prabodh Mathur, Laguna Niguel, CA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 953 days.

(21) Appl. No.: 14/548,094

(22) Filed: Nov. 19, 2014

(65) Prior Publication Data

US 2015/0147736 A1   May 28, 2015

Related U.S. Application Data

(60) Provisional application No. 61/907,989, filed on Nov. 22, 2013.

(51) Int. Cl.
*G09B 23/28* (2006.01)
*G09B 19/00* (2006.01)

(52) U.S. Cl.
CPC ............ *G09B 23/28* (2013.01); *G09B 23/285* (2013.01); *G09B 19/00* (2013.01)

(58) Field of Classification Search
None
See application file for complete search history.

(56) References Cited

U.S. PATENT DOCUMENTS

| | | | |
|---|---|---|---|
| 2014/0086273 A1* | 3/2014 | Gliner | A61B 18/1492 374/1 |
| 2014/0257275 A1* | 9/2014 | Cho | A61L 27/16 606/41 |

* cited by examiner

*Primary Examiner* — James Hull

(57) ABSTRACT

Simulation systems for demonstrating and/or testing medical devices and methods for demonstrating and/or testing medical devices using simulation systems are disclosed. An example simulation system may include a simulation module. The simulation module may include circuitry and one or more indicators. The circuitry may be capable of establishing impedance levels simulating impedances at tissue-electrode conduction paths. In some cases, the circuitry may be capable of sensing a temperature at the simulated tissue-electrode conduction paths. The one or more indicators may be able to provide indications corresponding to the established impedance levels. An example method of demonstrating or testing a medical device may include determining whether established impedance levels match electrode activation settings of an ablation generator (e.g., a medical device).

17 Claims, 8 Drawing Sheets

SIMULATION MODULE

CROSS-REFERENCE TO RELATED APPLICATIONS

This application claims priority under 35 U.S.C. § 119 to U.S. Provisional Application Ser. No. 61/907,898, filed Nov. 22, 2013, the entirety of which is incorporated herein by reference.

TECHNICAL FIELD

The present disclosure pertains to medical devices. More particularly, the present disclosure pertains to simulation modules for use with medical devices and methods for using the simulation modules with medical devices.

BACKGROUND

A wide variety of intracorporeal medical devices have been developed for medical use, for example, intravascular use. Some of these devices include guidewires, catheters, and the like. These devices are manufactured by any one of a variety of different manufacturing methods and may be used according to any one of a variety of methods. Of the known medical devices and methods, each has certain advantages and disadvantages. There is an ongoing need to provide alternative medical devices as well as alternative methods for manufacturing, using, demonstrating, and testing medical devices.

BRIEF SUMMARY

This disclosure provides devices for demonstrating and testing medical devices and methods for demonstrating and testing medical devices. An example device may include a simulation system for demonstrating and/or testing a medical device typically used in renal nerve ablation procedures. The simulation system may include a simulation module capable of communicating with an ablation generator. The simulation module may include circuitry and/or one or more indicators in communication with the circuitry. The circuitry may be able to establish impedances that correspond to one or more simulated tissue-electrode conduction paths. The indicators may be able to provide indications corresponding to the impedances established by the circuitry.

Methods for using the simulation system to demonstrate and/or test an ablation generator are disclosed. An example method may include establishing a communication link between an ablation generator and a simulation module. The method may also include establishing an impedance level associated with one or more ablation tissue-electrode conduction paths corresponding to a simulated position in a patient's body of one or more ablation electrodes. The established impedance level(s) may be communicated to the ablation generator via the established communication link to facilitate automatically setting an electrode activation setting at the ablation generator. The method may also include determining whether the electrode activation setting of the ablation generator matches the one or more established impedance levels.

Methods for demonstrating and/or testing an ablation generator capable of implementing electrode activation settings depending on sensed impedances at electrodes of an ablation catheter are disclosed. The method may include establishing impedance levels of one or more simulated ablation tissue-electrode conduction paths with a simulation module. The established impedance levels may be indicated with indicators on the simulation module. The one or more simulated impedance levels may be communicated to the ablation generator and the ablation generator may implement an electrode activation setting in view of the received one or more established impedance levels. The established impedance levels may be compared to the implemented electrode activation setting to determine if the ablation generator passes the test. If the indicated one or more established impedance levels match the implemented electrode activation setting, the ablation generator passes the test. If the indicated one or more established impedance levels do not match the implemented electrode activation setting, the ablation generator fails the test.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
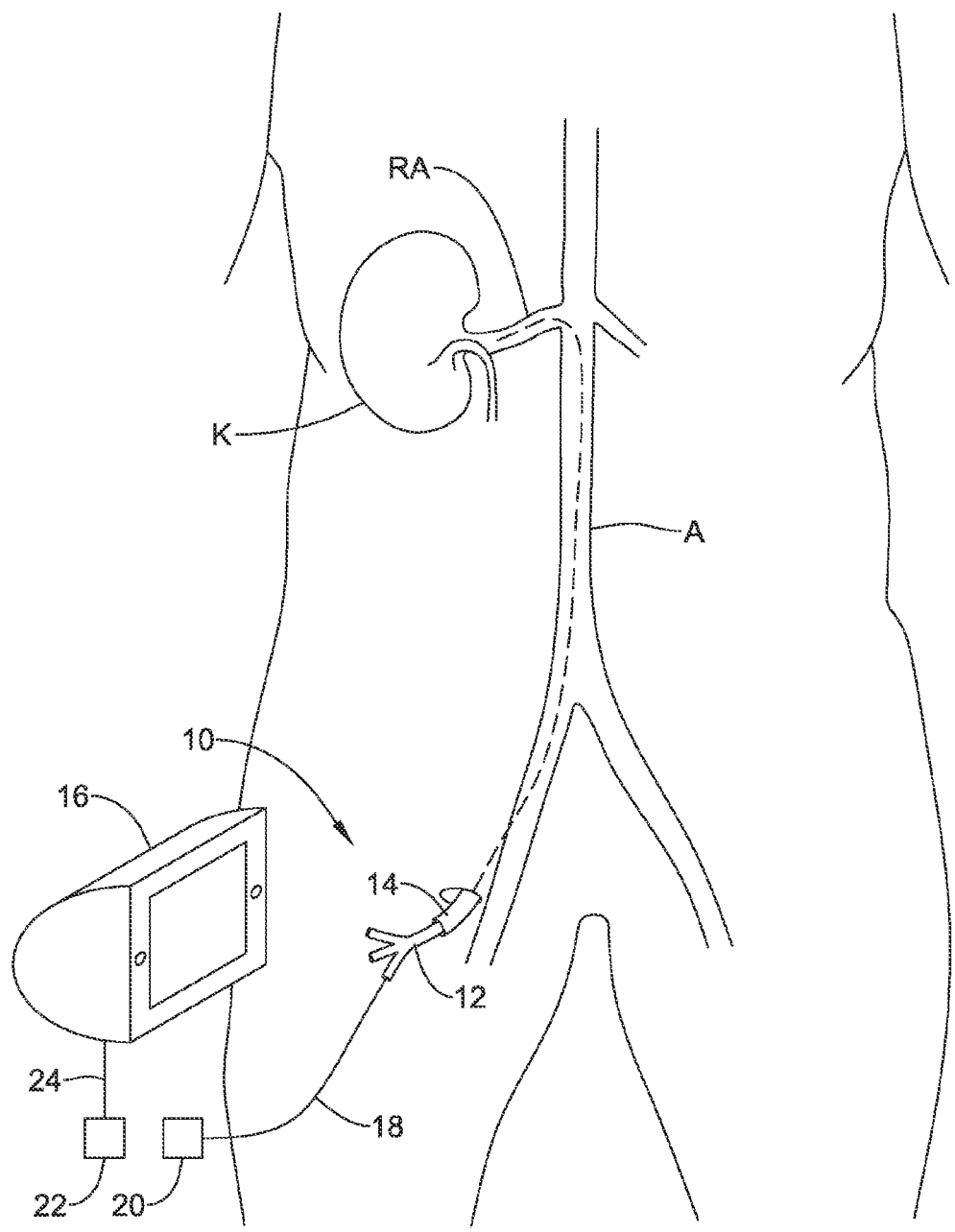
FIG. 1 is a schematic view of an illustrative medical device.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

Certain treatments are aimed at the temporary or permanent interruption or modification of select nerve function. One example treatment is renal nerve ablation, which is sometimes used to treat conditions such as or related to hypertension, congestive heart failure, diabetes, or other conditions impacted by high blood pressure or salt retention. The kidneys produce a sympathetic response, which may increase the undesired retention of water and/or sodium. The result of the sympathetic response, for example, may be an increase in blood pressure. Ablating some of the nerves running to the kidneys (e.g., disposed adjacent to or otherwise along the renal arteries) may reduce or eliminate this sympathetic response, which may provide a corresponding reduction in the associated undesired symptoms (e.g., a reduction in blood pressure).

While the devices and methods described herein are discussed relative to renal nerve ablation and/or modulation, it is contemplated that the devices and methods may be used with devices and methods used in other treatment locations and/or applications where nerve modulation and/or other tissue modulation including heating, activation, blocking, disrupting, or ablation are desired, such as, but not limited to: blood vessels, urinary vessels, or in other tissues via trocar and cannula access. For example, the devices and methods described herein can be used with devices and methods applied to hyperplastic tissue ablation, cardiac ablation, pulmonary vein isolation, pulmonary vein ablation, tumor ablation, benign prostatic hyperplasia therapy, nerve excitation or blocking or ablation, modulation of muscle activity, hyperthermia or other warming of tissues, etc.

Typical RF ablation therapies for treating hypertension and other medical issues may involve the use of highly conductive electrodes for high frequency RF ablation to generate heat. These highly conductive electrodes may be used to transfer electrical current to tissue of a patient. The tissue of a patient has an impedance to electrical energy, which leads to resistive heating of the tissue when the electrical energy comes into contact with the tissue. Essentially, a patient's tissue may act as a resistor of a circuit between an active electrode and a ground electrode.

FIG. 1 is a schematic view of an example renal nerve modulation system 10 (e.g., an RF ablation system including an ablation generator or control unit 16 and/or an ablation catheter 14). System 10 may include a medical device 12 (e.g., a renal nerve ablation medical device). The medical device 12 may be used to ablate nerves (e.g., renal nerves) disposed adjacent to the kidney K (e.g., renal nerves disposed about a renal artery RA). In one example, the medical device 12 may include the medical device disclosed in U.S. patent application Ser. No. 13/725,843, entitled "METHODS AND APPARATUSES FOR REMODELING TISSUE OF OR ADJACENT TO A BODY PASSAGE", filed on Dec. 12, 2012, now published as US2013-0165916A1, which is hereby incorporated by reference, in its entirety, for all purposes.

In use, the medical device 12 may be advanced through a blood vessel such as the aorta A to a position within the renal artery RA. This may include advancing the medical device 12 through a guide sheath or catheter 14. When positioned as desired, the medical device 12 may be activated to activate one or more electrodes (not shown). This may include coupling the medical device 12 to an ablation generator or control unit 16 having or connected to a power source (e.g., a generator, a battery) so as to supply the desired activation energy to the electrodes and/or control the operation of the medical device 12. In some instances, the medical device 12 may include a wire or conductive member 18 with a connector 20 that may be connected to a connector 22 on control unit 16 and/or a wire 24 coupled to control unit 16. In at least some embodiments, control unit 16 may also be utilized to supply/receive the appropriate electrical energy and/or signal to activate one or more electrodes disposed at or near a distal end of the medical device 12. When suitably activated, the electrodes may be capable of ablating tissue (e.g., renal nerves) and one or more sensors located adjacent the electrodes may be used to sense physical and/or biological parameters (e.g., temperature, as desired), as desired.

In some instances, physicians and/or other users of the renal nerve modulation system 10 may desire to test the ablation generator or control unit 16 to ensure it is operating as intended and/or desire to demonstrate the ablation generator or control unit 16. As disclosed herein, the ablation generator or control unit 16 may be tested and/or demonstrated with the use of a simulation module 26 to test or demonstrate the ablation generator or control unit 16 without exposing a patient to the renal nerve modulation system 10. The disclosed simulation module 26 may be capable of simulating various conditions at one or more simulated tissue-electrode conduction paths, where the one or more simulated tissue-electrode conduction paths simulate the conduction paths created when electrodes of the medical device 12 are active and interact with tissue of a patient.

Figure 2:
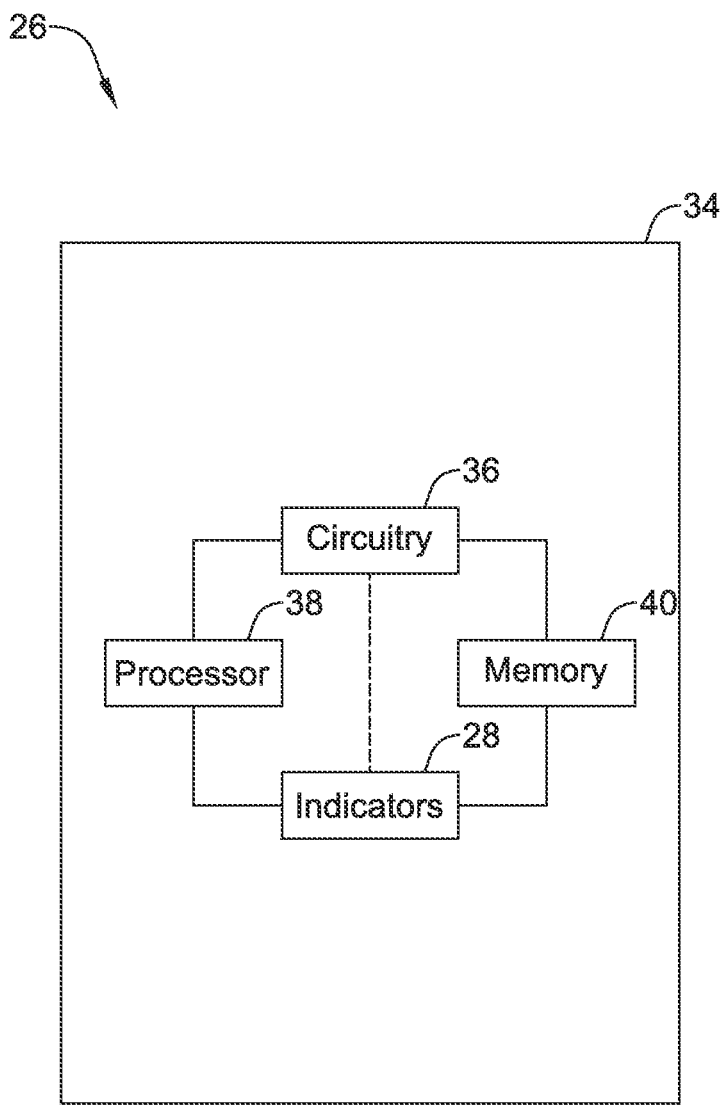
FIG. 2 is a schematic box diagram of an illustrative simulation module.

FIG. 2 depicts a schematic view of some illustrative features of the simulation module 26. The simulation module 26 may include a housing 34 enclosing circuitry 36 connected to a processor 38 and memory 40. The circuitry 36, the processor 38, and/or the memory 40 may be directly or indirectly connected to the indicators 28. In some cases, the circuitry 36 may optionally be connected directly to the indicators 28 (e.g., a Light Emitting Diode (LED) may be part of the circuitry), as indicated by the dotted line extending from the circuitry 36 to the indicators 28 in FIG. 2. Alternatively, or in addition, the circuitry 36 may be indirectly connected to the indicators through a branch circuit (not shown) extending from the circuitry 36. In some instances, the indicators 28 may activate when the circuitry 36 receives a requisite amount of electricity from an ablation catheter 14 and/or as prescribed by an ablation generator or control unit 16.

The circuitry 36 may be configured to simulate one or more tissue-electrode conduction paths. In some instances, the circuitry 36 may have or may be capable of establishing one or more impedances corresponding to the one or more simulated tissue-electrode conduction paths. For example, the circuitry 36 may provide particular impedances to an electrical current fed to the circuitry 36 (e.g., via a resistor or other mechanism for simulating impedances) from the simulation module 26 (e.g., where the electrical current or power reaches the circuitry 36 from a wall source (or the equivalent thereof) or a battery source contained or plugged into the simulation module 26). Alternatively, or in addition, the circuitry 36 may simulate impedances in response to receiving an electrical current, power, or other signal at the circuitry 36 (e.g., from an ablation catheter 42 or and ablation generator or control unit 16 connected to the simulation module 26).

The impedances of or established by the circuitry 36 may vary depending on simulated positions of the medical device 12 (e.g., an ablation catheter) within a patient's body. For example, the impedances may be indicative of impedances associated with active electrodes in communication with a patient's tissue (e.g., impedances at a tissue-electrode conduction path) and the impedances may vary depending on the position of the active electrodes with respect to a patient's tissue.

In some instances, the circuitry 36 may have or establish impedances associated with one or more simulated tissue-electrode conduction path through use of one or more resistor (e.g., the circuitry 36 may have a single set of circuitry for all simulated tissue-electrode conduction paths or the circuitry 36 may have several sets of circuitry with each set having one or more resistor and each set simulating the impedance of a tissue-electrode conduction path), where the resistor heats up similar to how tissue may heat up as it receives electrical power (e.g., electrical current multiplied by voltage) through an electrode of an ablation catheter. In such instances and/or other instances, the simulation module 26 may include one or more temperature sensors (e.g., thermistors in the circuitry 36 adjacent resistors or other temperature sensors adjacent the circuitry 36). Alternatively, or in addition, the temperature at a simulated tissue-electrode conduction path may be calculated with the processor 38 and/or the memory 40 from the power passing through the circuitry 36 and/or the set resistance of the circuitry 36. Temperature sensed or calculated by the temperature sensor may be communicated to the ablation generator or control unit 16, used by the simulation module to prevent over heating of the simulation module 26, stored in the memory 40 for data purposes, and/or displayed by an indicator that is viewable external the simulation module 26. In some instances, such temperature data may be used to indicate an ablation catheter 14 and/or ablation generator or control unit 16 is operating properly, and/or the temperature data may be used for other purposes.

The indicators 28 in communication with the circuitry 36 may provide indications corresponding to the impedances of or established by the circuitry 36 and/or sensed temperatures. Example indications provided by the indicators 28 may include, but are not limited to, indications that the simulation module 26 is receiving a signal from the ablation generator or control unit 16, the simulation module 26 is receiving or did receive settings of the ablation generator or control unit 16, the simulation module 26 is or is not receiving electricity from an ablation catheter 14 or ablation generator or control unit 16, etc. In some instances, the processor 38 and/or the memory 40 may connect to both the circuitry 36 and the indicators 28 to facilitate use of the indicators 28.

Illustratively, the memory 40 (e.g., a non-transitory computer readable medium) may store one or more software programs, databases, etc. for manipulating the circuitry 36 and/or utilizing the indicators 28 in response to various impedances of and/or established through the circuitry 36. Additionally, or alternatively, the memory 40 may be used for other purposes. The processor 38 may process the software programs in view of the impedance(s) of or established by the circuitry 36 and accordingly, send signals to the indicators 28 as established in the program (e.g., simulation module 26 may run a program to test electrodes of a connected ablation catheter 14). Alternatively, or in addition, the memory 40 and the processor 38 may interact with one another to establish impedances of the circuitry 36 in response to receiving signals from the ablation generator or control unit 16.

A user may interact with the circuitry 36, the processor 38, and/or the memory 40 of the simulation module 26 in any manner. For example, a user may utilize a user interface (not shown) through which a user may interact with the circuitry 36, the processor 38, the memory 40, and/or other features of the simulation module 26 to supply, modify, and/or interact with software programs, databases, etc. of and/or for the simulation module 26. The user interface may take on one or more forms, and different forms may be used in combination or as alternatives. Illustratively, the user interface may include one or more of an interface on the ablation generator or control unit 16 for interacting with the features of the simulation module 26, a keyboard and/or touchpad connected to or connectable to the simulation module 26 in a wired or wireless manner, a touch screen on or capable of communicating with the simulation module 26, one or more sensors on or capable of communicating with the simulation module 26, a voice operated control system, one or more switches on or in communication with the simulation module 26, and/or other user interfaces capable of interacting with the circuitry 36, the processor 38, the memory 40 and/or other features of the simulation module 26. In some cases, the simulation module 26 may include one or more wired or wireless ports for receiving a connector and/or for facilitating a connection between the user interface and the simulation module 26.

Figure 3:
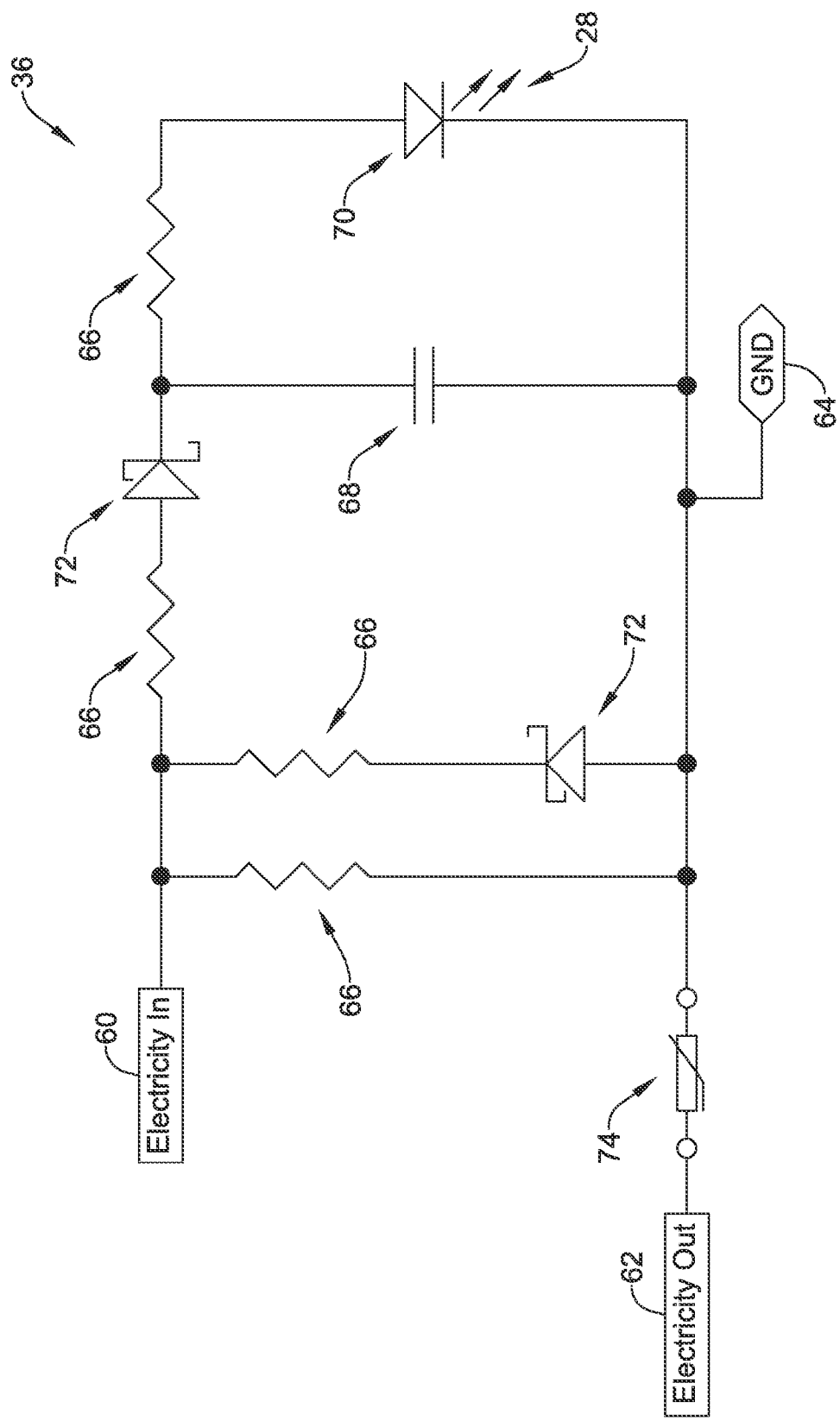
FIG. 3 is a schematic electrical diagram of illustrative circuitry for the a simulation module.

FIG. 3 is a schematic circuit diagram of an illustrative circuitry 36 for simulating a single tissue-electrode conduction path within and/or with the simulation module 26. The illustrative circuitry 36 may include an electricity-in 60, an electricity-out 62, a ground 64, one or more resistors 66, one or more capacitors 68, one or more diodes (e.g, one or more Light Emitting Diodes (LEDs) 70 (e.g., indicator(s) 28), one or more Shottkey diodes 72, and/or one or more other diodes), one or more thermistors 74 and/or one or more other electrical features. In some instances, the circuitry 36 may include one or more additional and/or other electrical features to facilitate the simulation of tissue-electrode conduction paths and/or testing of ablation devices. Note, the connections between the circuitry 36 and the processor 38 and/or the memory 40, as discussed above, are not shown in FIG. 3.

Figure 4:
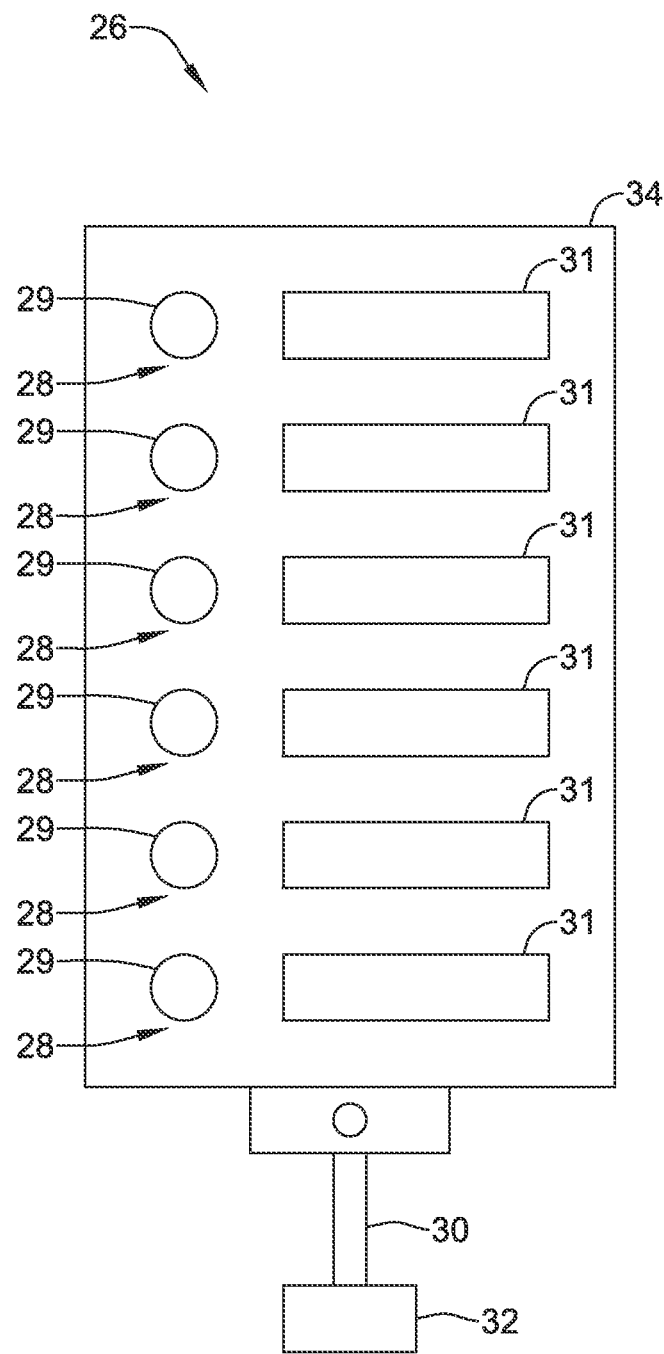
FIG. 4 is a schematic view of an illustrative simulation module.

As shown in FIG. 4, the simulation module 26 may include one or more indicators 28 (e.g., indicators viewable and/or audible external the housing 34 of the simulation module or other indicators), a wire or conductive member 30 (optional), a connector 32, and a housing 34. The indicators 28 may be viewable from exterior the housing 34 of the simulation module 26 to provide visual indication that the simulation module 26 and, optionally, the circuitry 36 (e.g., the simulated tissue-electrode conduction paths) are receiving a signal from the ablation generator or control unit 16 (e.g., via electrical current transferred through electrodes connected to the ablation generator or control unit 16, a control signal indicating a setting of the ablation generator or control unit 16, electrical current transferred through a battery, electrical current transferred through a wall plug in, or other similar or dissimilar signal received from the ablation generator or control unit 16). Alternatively, or in addition, the visual indications provided by the indicators 28 may indicate electrodes on an ablation catheter 42 are working properly in response to interactions between the electrodes of an ablation catheter and the simulation module 26.

In some instances, not shown, the simulation module 26 may not have any visual or audible indicators 28. In instances when the simulation module 26 does not include any visual or audible indicators 28 and in any other instances, the simulation module 26 may send one or more indication signals to a connected ablation generator or control unit 16 or other device to indicate whether connected devices are operating properly.

The indicators 28 may be any type of indicators. In one example, the indicators 28 may include a series of lights 29, where each light 29 is associated with a color coded marker 31. In the example, the lights 29 and the color coded markers 31 may each be affiliated with an impedance level or range of impedance levels associated with a simulated tissue-electrode conduction path. In the example, each indicator 28 may correspond to a separate electrode of an ablation catheter. Where a simulated tissue-electrode conduction path is receiving electricity from the generator or controller 16, the light 29 may light up and the light and/or the color coded markers 31 associated therewith may adjust its color to indicate an established impedance level. In another example, each light 29 and/or color coded marker 31 may have a static color associated with an impedance level or ranges of impedance levels within the simulation module 26. In instances where the simulation module 26 is receiving electricity or a signal from the generator or controller 16 (e.g., directly or through an ablation catheter 14), the light 29 adjacent a particular color coded marker 31 may light up to indicate the desired impedance level has been reached in the circuitry 36 at an associated electrode of an ablation catheter (e.g., at an actual ablation catheter 14 or at a simulated ablation catheter when the ablation generator or control unit 16 is being tested without an ablation catheter 14) resulting from the received electricity or signal.

In addition to, or as an alternative to, providing a visual indication with the indicators 28, the simulation module 26 may provide other indications of received electricity or signals from the ablation generator or control unit 16. In one example, the simulation module 26 may provide audible indications, audible and visual indications, indication signals sent to the ablation generator or control unit 16, and/or other indications of received electricity or signals from the ablation generator or control unit 16.

Figure 5:
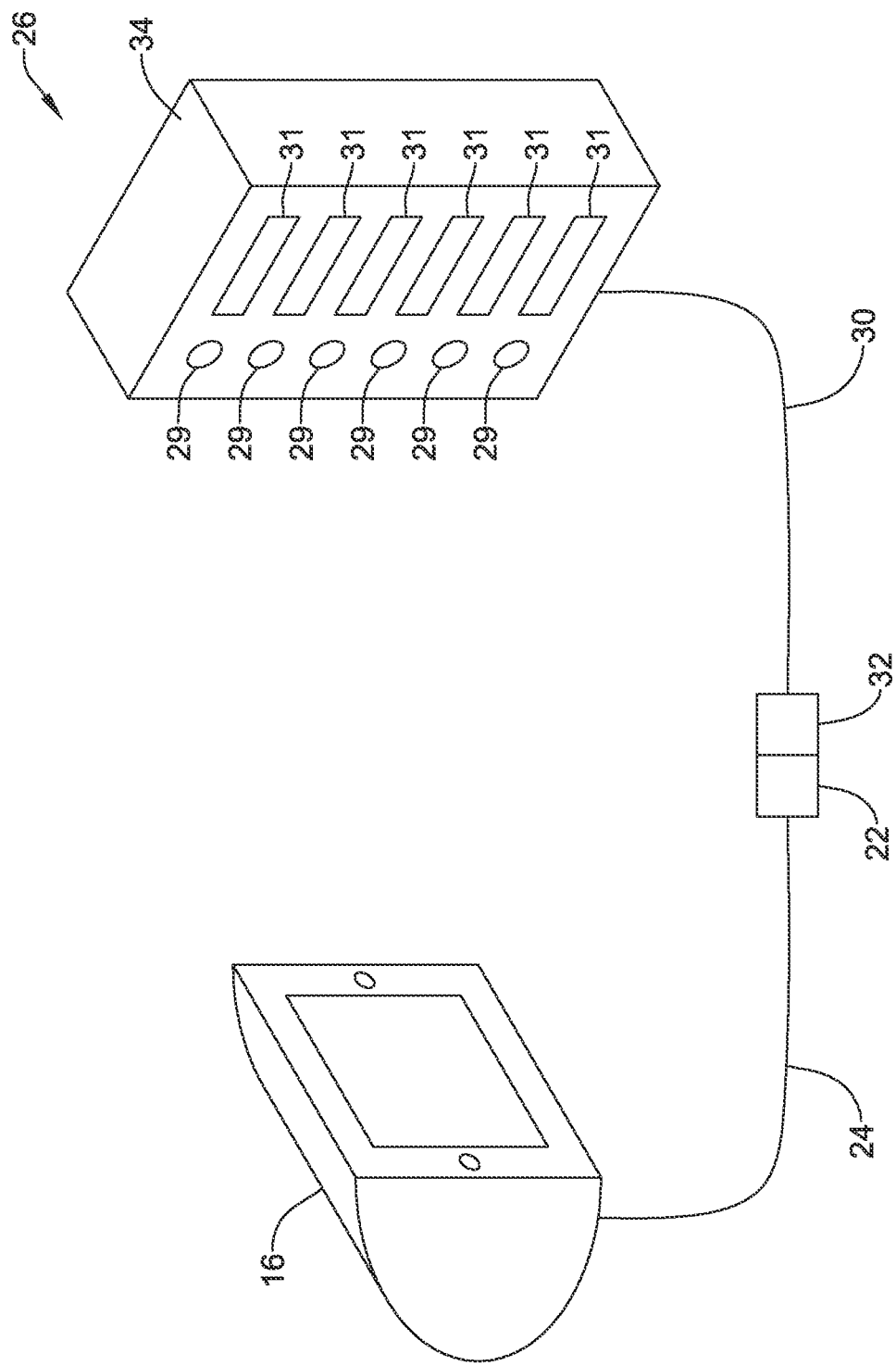
FIG. 5 is a schematic perspective view of an illustrative simulation module and an illustrative control unit.
Figure 6:
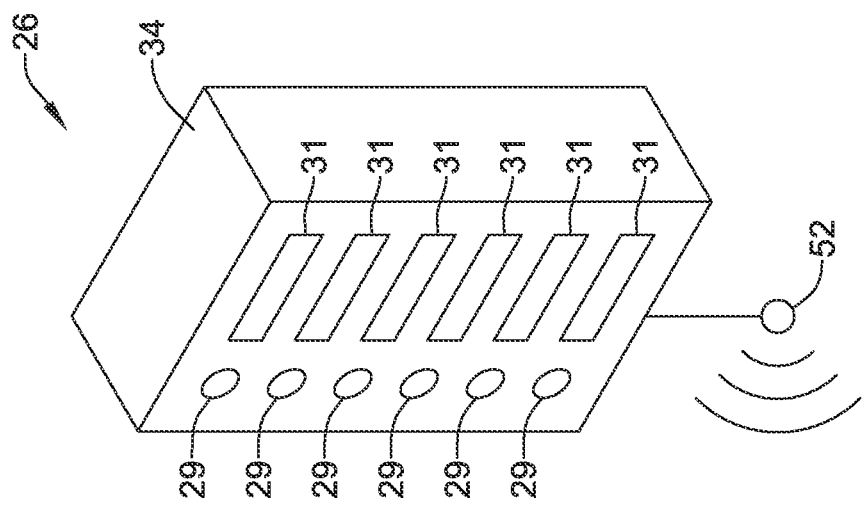
FIG. 6 is a schematic perspective view of an illustrative simulation module and an illustrative control unit.
Figure 6:
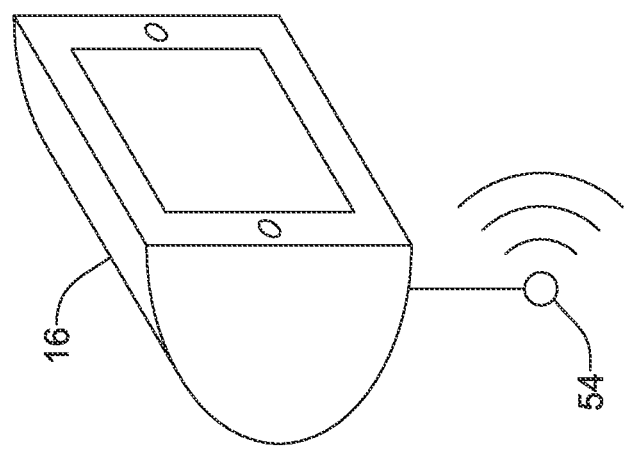
Figure 7:
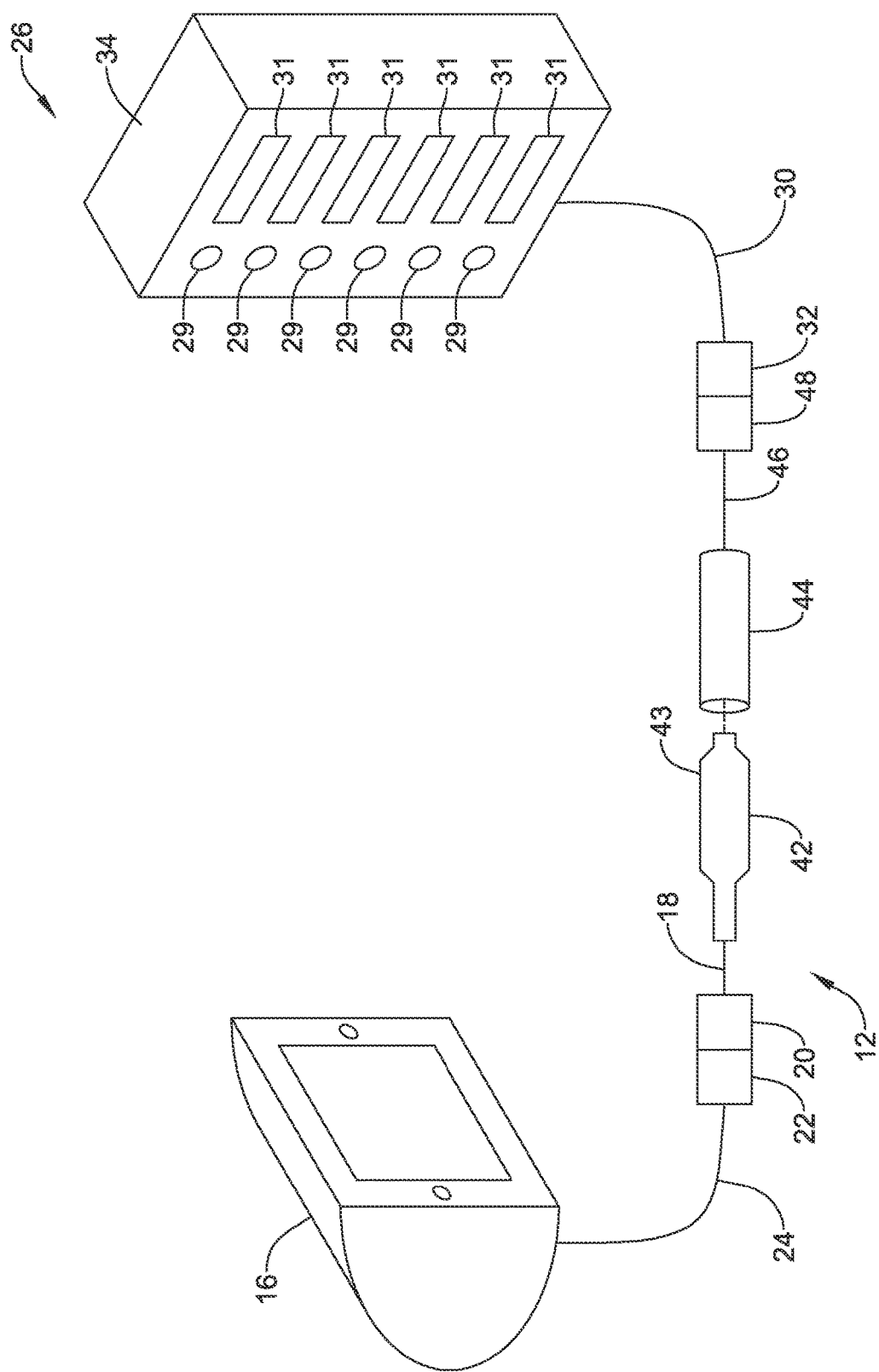
FIG. 7 is a schematic perspective view of an illustrative simulation module, an illustrative medical device, and an illustrative control unit.

The simulation module 26 may be capable of electrically interacting with an ablation generator or control unit 16, as shown for example in FIGS. 5-7. The simulation module 26, as shown in FIG. 5, may be physically connected (e.g., with a wired connection) to the ablation generator or control unit 16. In one example, the connector 32 connected to the simulation module 26 via the wire or conductive member 30 may physically connect (e.g., physically connect with a mechanical or electrical mechanical connection) to the connector 22 connected to the ablation generator or control unit 16 via the wire or conductive member 24. Alternatively, or in addition, the connector 32 connected to the simulation module 26 may connect to the ablation generator or control unit 16 in any other manner.

As shown in FIG. 6, the simulation module 26 may be connected to the ablation generator or control unit 16 in a wireless manner. In one example, the simulation module 26 may include a wireless transmitter 52 that is capable of one-way or two-way communication with a wireless transmitter 54 of the ablation generator or control unit 16. The wireless transmitters 52, 54 may be any type of wireless transmitter with any type of wireless connection (e.g., one or more of BLUETOOTH™, WiFi connection, near field communication, ZIGBEE™ or other wireless connection) utilizing any communication protocol.

In instances where the simulation module 26 communicates with the ablation generator or control unit 16 wirelessly and/or other instances (e.g., instances where there is wired communication), the simulation module 26 may be capable of providing electrical energy to the circuitry 36 during a simulated tissue-electrode treatment (e.g., a simulated renal denervation treatment). Such electrical energy may be obtained through an outside source (e.g., a source external the simulation module 26) other than the ablation generator or control unit 16, such as through a connection to the grid, a connection to a generator, a connection to a battery, or any other electrical connection.

As shown in FIG. 7, the simulation module 26 and/or the ablation generator or control unit 16 may be utilized with an ablation catheter 42 (e.g., the medical device 12). The ablation catheter 42 may be a renal denervation catheter such as the catheter disclosed in U.S. Ser. No. 13/725,843 incorporated by reference above, or any other renal denervation catheter or any other ablation catheter.

Illustratively, the ablation catheter 42 may include a connector 50 at a proximal end that may be capable of connecting to the connector 22 of the ablation generator or control unit 16. In one example, the ablation catheter 42 may communicate with the simulation module 26 via a receiver 44. The receiver 44 may be in communication with a connector 48 via a wire or conductive member 46, where the connector 48 may connect with the connector 32 of the simulation module 26.

In some instances, the ablation catheter 42 may provide a communication link between the simulation module 26 and the ablation generator or control unit 16. For example, the ablation catheter 42 may provide an electrode activation setting of the ablation generator or control unit 16 to the simulation module 26 through activation of electrodes thereon or through any other signal transferring mechanism and the simulation module 26 may communicate the impedances established by the simulation module 26 to the ablation generator or control unit 16. Illustratively, the communication from the simulation module 26 to the ablation generator or control unit 16 may be provided through the electrodes of the ablation catheter 42 or other electrical conductors in the ablation catheter 42.

The receiver 44 may take on any shape and/or configuration capable of receiving the ablation catheter 42 or a portion of the ablation catheter 42. In one example, the receiver 44 may take on a tube formation or other formation capable of receiving an expandable portion 43 of the ablation catheter 42 (e.g., an expanded or deflated expandable portion 43 having electrodes thereon). In some instance the receiver 44 may include electrical contacts that may be capable of communicating with electrodes on the received expandable portion 43 such that electrical signals from the ablation generator or control unit 16 may be communicated from the electrodes to the simulation module 26.

The simulation module 26 may be selectively programmable to simulate two or more catheters capable of being positioned within a patient's body, where each of the two or more catheters may include electrodes. In one example, at least one of the two or more catheters may have one or more of a diameter that is different than a diameter of at least one other catheter of the two or more catheters, a geometric shape that is different than a geometric shape of at least one other catheter of the two or more catheters, a number of electrodes that is different than a number of electrodes of at least one other catheter of the two or more catheters, or an arrangement of electrodes that is different than an arrangement of at least one other catheter of the two or more catheters.

Figure 8:
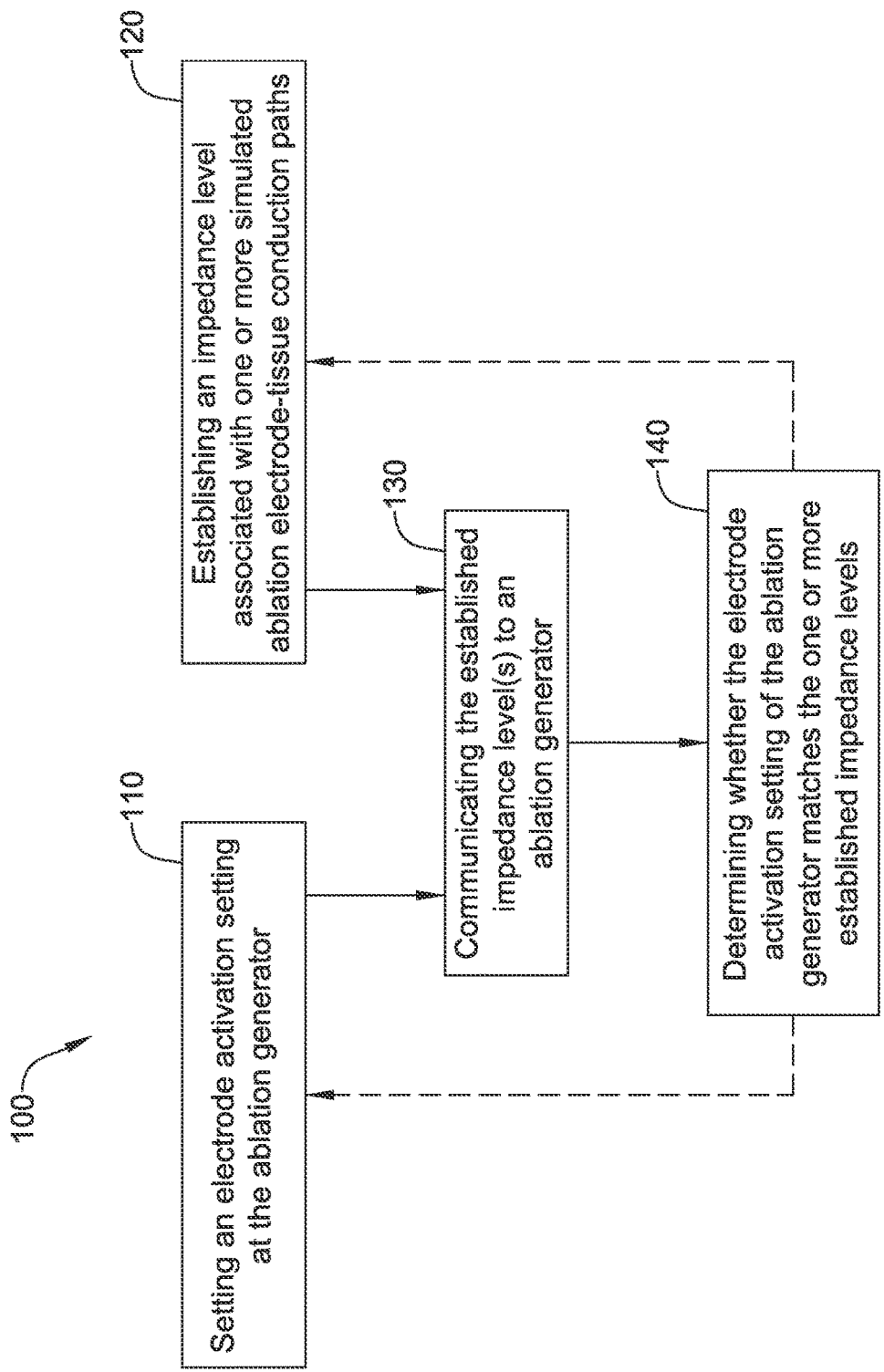
FIG. 8 is a schematic flow diagram showing an illustrative method of using a simulation module.

As shown in FIG. 8, the simulation module 26 may be utilized in a method 100 of testing the ablation generator or control unit 16. The method 100 may include setting 110 an electrode activation setting at the ablation generator or control unit 16 and establishing 120 an impedance level in the simulation module 26 associated with one or more simulated ablation tissue-electrode conduction paths corresponding to a simulated position in a patient's body of one or more ablation electrodes. The setting 110 of the ablation activation setting at the ablation generator or control unit 16 and the establishing 120 of the impedance level(s) in the simulation module 26 may be performed in any order, as desired. Once set, the electrode activation setting may be sent to the simulation module 26 via an electrical current or a signal passing through the ablation catheter 42, any other wired connection, or a wireless connection.

In some instances, the impedance level(s) set in the simulation module 26 may be single, permanent impedance level(s) established by the circuitry 36. Additionally, or alternatively, one or more of the impedance level(s) of or established in the simulation module 26 may be adjustable. In one example, the one or more impedance levels may be adjusted to simulate different tissue-electrode conduction paths. Different tissue-electrode conduction paths may arise during an operation (and thus need to be simulated) when an ablation catheter 42 is inserted into a patient's vessel and the one or more electrodes of the ablation catheter 42 are at adjustable positions with respect to a target tissue. For example, when an electrode is directly adjacent a target tissue, the tissue-electrode conduction path may be considered a good path and the tissue may provide an expected electrical impedance, but when the electrode is not adjacent the target tissue, the tissue-electrode conduction path may be considered a poor path and there may be a reduced or different electrical impedance than what would be expected at a good path caused by the electricity from the electrode passing through material (e.g., blood) other than the target tissue.

To allow the simulation module 26 and the ablation generator or control unit 16 to communicate with one another, one or more communication links therebetween may be established. The communication link(s) may be any type(s) of communication link(s). In some instances, the communication link(s) may facilitate one-way communication (e.g., communication from the ablation generator or control unit 16 to the simulation module 26, or communication from the simulation module 26 to the ablation generator or control unit 16) and/or two-way communication (e.g., communication from the ablation generator or control unit 16 to the simulation module 26 and communication from the simulation module 26 to the ablation generator or control unit 16). In one example, the communication link(s) may be established between the ablation generator or control unit 16 and the simulation module 26 by connecting an ablation catheter 42 (e.g., a catheter with electrodes thereon) to the ablation generator or control unit 16 and the simulation module 26 (see FIG. 7) and/or by establishing a wireless connection between the ablation generator or control unit 16 and the simulation module 26 (see FIG. 6).

Once the electrode activation setting at the ablation generator or control unit 16 is set, the impedance level(s) at the simulation module 26 have been set, and a communication link has been established, the established impedance level(s) of the simulation module 26 may be communicated 130 to the ablation generator or control unit 16. In some instances, the established impedance level(s) of the simulation module 26 may be communicated to the ablation generator or control unit 16 in response to the simulation module receiving electrical current or a signal from the ablation generator or control unit 16 corresponding to the set electrode activation setting. In addition to, or as an alternative to, sending the ablation generator or control unit 16 the set impedance levels in response to receiving the electrical current or signal from the ablation generator or control unit 16, the simulation module 26 may indicate impedance levels at various simulated tissue-electrode conduction paths with the indicators 28 in response to receiving the electrical current or signal corresponding to the set electrode activation setting.

The impedance level(s) may be communicated from the simulation module 26 to the ablation generator or control unit 16 in any manner. For example, the impedance level(s) may be communicated from the simulation module 26 to the ablation generator or control unit 16 in a manual manner (e.g., manually entered at the ablation generator or control unit 16), in an automated manner via a wired connection between the ablation generator or control unit 16 and the simulation module 26 (e.g., via the communication link), in an automated manner via a wireless connection between the ablation generator or control unit 16 and the simulation module 26 (e.g., via the communication link), or through any other manner. Communicating the established impedance level(s) manually or through the established communication link(s) may facilitate allowing the ablation generator or control unit 16 to set (e.g., automatically set or set after a user prompt) an electrode activation setting in view of the received established impedance levels.

Other features may be sensed and/or determined by the simulation module 26 in response to receiving an electrical current or signal from the ablation generator or control unit 16. In one example, the simulation module 26 may sense a temperature adjacent a resistor in the circuitry 36 used to establish the impedance levels of the one or more simulated ablation tissue-electrode conduction paths. Illustratively, the resistor in the circuitry 36 may be capable of heating up in a same or similar manner as a patient's tissue would heat up when it is in contact with an ablation electrode. The sensed or determined temperature may be communicated to the ablation generator or control unit 16 in a manner similar to or dissimilar to how the impedance levels are communicated from the simulation module 26 to the ablation generator or control unit 16. In response to receiving the sensed or determined temperature, the ablation generator or control unit 16 may adjust its electrode activation setting if the temperature exceeds a set threshold value (e.g., a threshold value above a temperature at which a patient's tissue may be undesirably burned or scarred).

Once the established impedance level(s) and/or other sensed/determined features have been communicated to the ablation generator or control unit 16, it may be determined 140 whether the electrode activation setting of the ablation generator or control unit 16 matches the one or more established impedance levels. In some instances, the electrode activation setting may match the set impedance levels if the indicators 28 (e.g., visual indicators) indicate the simulation module 26 received electricity or signals from the ablation generator or control unit 16 consistent with the electrode activation setting thereof. This determining feature 140 may be performed by manually determining whether the indicators 28 on the simulation module 26 indicate the expected indications based on the electrode activation setting of the ablation generator or control unit 16 (e.g., manually comparing visual indicators on the simulation module 26 to the ablation generator or control unit 16) or by automatically determining at the ablation generator or control unit 16 or the simulation module 26 whether the indicators 28 on the simulation module 26 match the expected indications based on the electrode activation setting of the ablation generator or control unit 16. As indicated in FIG. 8 by dashed arrows, once it has been determined whether the electrode activation setting matches the established impedance levels, the process may be repeated for different electrode activation settings and/or different established impedance levels.

In one example, the simulation module 26 may receive an electrical signal (e.g., an electrical current capable of powering the circuitry 36 or other signal) from the ablation generator or control unit 16 and indicate through indicators 28 that it is receiving a signal. Such indicators 28 may simply provide the indication that a signal was received from the ablation generator or control unit 16 at the simulation module 26 or provide more detailed information about the signal received, as discussed above (e.g., provide indications as to which tissue-electrode conduction paths are receiving power or are active, etc.).

In another example, the simulation module 26 may receive an initial electrical signal from the ablation generator or control unit 16 and may indicate through indicators 28 that it is receiving a signal. Such indicators 28 may indicate some or all of the simulated tissue-electrode conduction paths are receiving electricity or a signal at a particular impedance level. The impedance levels may then be communicated back to ablation generator or control unit 16 from the simulation module (e.g., manually communicated or automatically communicated) and the electrode activation settings may be adjusted in response to the established impedance levels of the simulated tissue-electrode conduction paths. Then, an electrical current or signals consistent with the adjusted electrode activation settings may be sent back to the simulation module 26, and it may be determined whether the indicators 28 of the simulation module 26 match the electrode activation setting of the ablation generator or control unit 16. If there is a match, the ablation generator or control unit 16 may pass the test. If there is not a match, the ablation generator may fail the test.

Illustratively, this method of testing may be repeated by establishing a first impedance level at one or more simulated tissue-electrode conduction paths, setting a first electrode activation setting, sending the first impedance level(s) to the ablation generator or control unit 16, determining if there is a match between the first impedance level(s) and the electrode activation setting, establishing second impedance level at the one or more simulated tissue-electrode conductions paths different than the first impedance level(s), setting a second electrode activation setting, sending the established second impedance level(s) to the ablation generator or control unit 16, determining if there is a match between the second impedance level(s) and the second electrode activation setting, and so on. Such repeated testing may test the ablation generator or control unit 16 or ablation catheter 42 to determine its ability to control which electrodes of the ablation catheter 42 are receiving power in response to receiving positional information about the electrodes within a vessel of the patient (e.g., differing impedance levels may indicate differing positions of the electrodes within a patient).

Various standards may be used to determine if the indicators 28 of the simulation module 26 match the electrode activation setting of the ablation generator or control unit 16. In one example, the indicators 28 of the simulation module 26 may indicate which electrodes of a catheter are receiving power and the impedance level at those electrodes, where the impedance level may be indicative of a simulated position of the catheter within a patient's body. In the example, if such indicators 28 are consistent with the electrode activation setting set at the ablation generator or control unit 16 (e.g., where the electrode activation setting determines which electrodes are to receive electricity), the indicators 28 and the electrode activation setting may be said to match. If such indicators indicate a different electrode activation setting than the one set at the ablation generator or control unit 16, the indicators 28 and the electrode activation setting may be said to not match. A test pass/fail indication or other indication as to whether the electrode activation setting and indicators 28 match may be displayed or sounded at the ablation generator or control unit 16 and/or the simulation module 26.

Additionally, or alternatively, the simulation module 26 may be utilized in a method of demonstrating the system 10 (e.g., the ablation generator or control unit 16) without the need for an ablation catheter. Such a method of demonstration may allow a user to show how the ablation generator or control unit 16 operates without the need to use an active ablation catheter and/or a patient. As discussed above at least with respect to the testing of the ablation generator or control unit 16, the ablation generator or control unit 16 in combination with the simulation module 26 may demonstrate how the system 10 may adjust its settings in response to receiving various data concerning the positioning and use of electrodes on an ablation catheter and the areas adjacent the electrodes on an ablation catheter.

Although the features of the methods described herein may be described and/or shown in one or more particular orders, it is contemplated the features of the disclosed methods may be effected in any order, unless expressly indicated otherwise.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A simulation system for simulating a tissue-electrode conduction path of electrodes on an expandable portion of a catheter with the tissue of a patient, comprising:
    a simulation module; and a receiver having one or more electrical contacts in electrical connection with the simulation module, the receiver configured to receive the expandable portion of the catheter and configured for electrical contact through the one or more electrical contacts with the electrodes on the received expandable portion;

wherein the simulation module comprises circuitry, a processor, and a memory, the simulation module configured to simulate one or more impedances corresponding to one or more predetermined tissue-electrode conduction paths by providing a particular impedance to the one or more electrical contacts of the receiver in response to receiving an electrical current, power, or other signal at the circuitry.

2. The simulation system of claim 1, wherein the circuitry is configured to establish impedances corresponding to a plurality of simulated tissue-electrode conduction paths.

3. The system of claim 2, wherein the impedances vary depending on simulated locations within a simulated patient's body of the electrodes.

4. The system of claim 2, wherein one or more of the impedances are indicative of impedances associated with active electrodes in communication with a patient's tissue.

5. The simulation system of claim 1, wherein the simulation module comprises one or more indicators in communication with the circuitry, where the one or more indicators are capable of providing indications corresponding to the simulated one or more tissue-electrode conduction paths.

6. The system of claim 5, wherein the indicators are viewable from external the simulation module.

7. The system of claim 1, further comprising:
an ablation catheter in communication with the simulation module and an ablation generator.

8. The system of claim 7, wherein the ablation catheter communicates impedances of the circuitry of the simulation module to the ablation generator.

9. The system of claim 8, wherein the ablation generator sets an electrode activation setting in response to receiving the impedances of the circuitry of the simulation module.

10. The system of claim 9, wherein the simulation module comprises one or more indicators for each simulated electrode of a simulated tissue-electrode conduction path.

11. The system of claim 9, wherein the simulation module is selectively programmable to simulate two or more catheters capable of being positioned within the patient's body, where the two or more catheters comprise electrodes to be simulated.

12. The system of claim 11, wherein at least one catheter of the two or more catheters has a diameter that is different than a diameter of at least one other catheter of the two or more catheters.

13. The system of claim 11, wherein at least one catheter of the two or more catheters has a geometric shape that is different than a geometric shape of at least one other catheter of the two or more catheters.

14. The system of claim 11, wherein at least one catheter of the two or more catheters has a number of electrodes that is different than a number of electrodes on at least one other catheter of the two or more catheters.

15. The system of claim 9, wherein the simulation module is capable of sensing a temperature at an electrode associated with one or more simulated tissue-electrode conduction paths.

16. The system of claim 9, wherein the simulation module is capable of receiving electrical energy to power the circuitry during a simulated tissue-electrode treatment, is capable of providing electrical energy to the circuitry during a simulated tissue-electrode treatment, or both.

17. The simulation system of claim 9, wherein the receiver comprises a plurality of electrical contacts that are configured to communicate with the electrodes on the received expandable portion.

* * * * *